(12) United States Patent
Churikov et al.

(10) Patent No.: US 10,481,324 B2
(45) Date of Patent: Nov. 19, 2019

(54) FIBER OPTIC DIFFRACTION GRATING

(71) Applicant: Chiral Photonics, Inc., Pine Brook, NJ (US)

(72) Inventors: Victor Churikov, West Patterson, NJ (US); Victor Il'ich Kopp, Fair Lawn, NJ (US)

(73) Assignee: Chiral Photonics, Inc., Pine Brook, NJ (US)

( * ) Notice: Subject to any disclaimer, the term of this patent is extended or adjusted under 35 U.S.C. 154(b) by 0 days.

(21) Appl. No.: 15/612,246

(22) Filed: Jun. 2, 2017

(65) Prior Publication Data
US 2017/0269293 A1    Sep. 21, 2017

Related U.S. Application Data

(63) Continuation of application No. 12/642,498, filed on Dec. 18, 2009, now abandoned.
(Continued)

(51) Int. Cl.
*G02B 6/02*    (2006.01)

(52) U.S. Cl.
CPC ......... *G02B 6/021* (2013.01); *G02B 6/02357* (2013.01); *G02B 6/02361* (2013.01); *G02B 6/02376* (2013.01); *G02B 2006/0209* (2013.01)

(58) Field of Classification Search
CPC ............... G02B 6/021; G02B 6/02357; G02B 6/02361; G02B 6/02376; G02B 2006/0209
See application file for complete search history.

(56) References Cited

U.S. PATENT DOCUMENTS

| 4,824,206 A * | 4/1989 | Klainer ............. G01N 21/7703 385/12 |
| 5,802,236 A | 9/1998 | DiGiovanni et al. |

(Continued)

FOREIGN PATENT DOCUMENTS

| JP | 2004-102281 | 4/2004 |
| WO | WO 2002/073247 A2 | 9/2002 |

(Continued)

OTHER PUBLICATIONS

Kopp et al., Transmission through chiral twist defects in anisotropic periodic structures, Opt. Lett. 28, 349-351 (2003).*
(Continued)

*Primary Examiner* — Peter Radkowski
(74) *Attorney, Agent, or Firm* — Knobbe, Martens, Olson & Bear, LLP

(57) ABSTRACT

The present invention is directed to an optical fiber grating having a core, that is capable of controlling the light signal transmission therethrough by causing at least one of: at least one spectral peak, and/or at least one spectral dip in its core light transmission spectrum, corresponding to at least one predetermined wavelength. The inventive optical fiber diffraction grating comprises at least one longitudinally positioned structural element of a predetermined geometric profile and that is configured for diffracting a portion of the transmitted light signal at at least one predefined wavelength thereof, from at least one core mode into at least one of: at least one cladding mode and/or at least one radiating mode. Various embodiments of a number of novel techniques for fabrication of the inventive optical fiber diffraction grating are provided, inclusive of a novel technique for fabricating the inventive grating from a single material. Advantageously, such novel fabrication techniques rely on configuration of a desired geometric profile for the at least one structural element portion of the novel grating, each profile (Continued)

comprising a number of readily configurable parameters that can be selected and/or adjusted during fabrication, to produce a variety of novel fiber diffraction gratings, each having a corresponding specific desirable core transmission spectrum having at least one of: least one spectral peak, and/or at least one spectral dip therein, corresponding to at least one specific desired wavelength, dependent on the configuration of the applicable geometric profile.

11 Claims, 2 Drawing Sheets

Related U.S. Application Data

(60) Provisional application No. 61/138,907, filed on Dec. 18, 2008.

(56) References Cited

U.S. PATENT DOCUMENTS

| | | | |
|---|---|---|---|
| 6,005,999 A | 12/1999 | Singh et al. | |
| 6,396,859 B1 | 5/2002 | Kopp et al. | |
| 6,404,789 B1 | 6/2002 | Kopp et al. | |
| 6,411,635 B1 | 6/2002 | Kopp et al. | |
| 6,415,079 B1 | 7/2002 | Burdge et al. | |
| 6,671,293 B2* | 12/2003 | Kopp | G02B 6/02085 372/39 |
| 6,678,297 B2 | 1/2004 | Kopp et al. | |
| 6,721,469 B2 | 4/2004 | Kopp et al. | |
| 6,741,631 B2 | 5/2004 | Kopp et al. | |
| 6,744,943 B2 | 6/2004 | Kopp et al. | |
| 6,792,169 B2 | 9/2004 | Kopp et al. | |
| 6,839,486 B2 | 1/2005 | Kopp et al. | |
| 6,875,276 B2 | 4/2005 | Shibayev et al. | |
| 6,891,992 B2 | 5/2005 | Kopp et al. | |
| 6,925,230 B2* | 8/2005 | Kopp | G02B 6/02085 385/27 |
| 7,009,679 B2 | 3/2006 | Kopp et al. | |
| 7,095,911 B2 | 8/2006 | Kopp et al. | |
| 7,142,280 B2 | 11/2006 | Kopp et al. | |
| 7,242,702 B2 | 7/2007 | Kopp et al. | |
| 7,308,173 B2 | 12/2007 | Kopp et al. | |
| 7,463,800 B2 | 12/2008 | Kopp et al. | |
| 7,978,947 B2* | 7/2011 | Goto | G02B 6/02323 385/123 |
| 7,983,515 B2 | 7/2011 | Zhang et al. | |
| 8,035,891 B2* | 10/2011 | Goto | G02B 6/02347 359/341.1 |
| 8,218,921 B2 | 7/2012 | Kopp et al. | |
| 8,326,099 B2 | 12/2012 | Singer et al. | |
| 8,457,456 B2 | 6/2013 | Kopp et al. | |
| 8,463,094 B2 | 6/2013 | Kopp et al. | |
| 8,712,199 B2 | 4/2014 | Kopp et al. | |
| 8,948,547 B2 | 2/2015 | Kopp | |
| 9,766,407 B2 | 9/2017 | Weiner et al. | |
| 9,810,845 B2 | 11/2017 | Kopp | |
| 9,817,191 B2 | 11/2017 | Kopp et al. | |
| 9,851,510 B2 | 12/2017 | Kopp | |
| 9,857,536 B2 | 1/2018 | Kopp et al. | |
| 9,885,825 B2 | 2/2018 | Kopp | |
| 9,921,355 B2 | 3/2018 | Weiner et al. | |
| 9,983,362 B2 | 5/2018 | Kopp et al. | |
| 10,078,019 B2 | 9/2018 | Kopp et al. | |
| 10,101,536 B2 | 10/2018 | Kopp et al. | |
| 10,126,494 B2 | 11/2018 | Kopp | |
| 10,197,736 B2 | 2/2019 | Kopp | |
| 2002/0003827 A1 | 1/2002 | Genack et al. | |
| 2002/0069676 A1 | 6/2002 | Kopp et al. | |
| 2002/0071881 A1* | 6/2002 | Kopp | C03B 37/0253 425/66 |
| 2002/0118710 A1 | 8/2002 | Kopp et al. | |
| 2002/0131707 A1* | 9/2002 | Kopp | G02B 6/02085 385/37 |
| 2002/0172461 A1 | 11/2002 | Singer et al. | |
| 2003/0118266 A1* | 6/2003 | Kopp | G01K 11/165 385/12 |
| 2003/0118285 A1* | 6/2003 | Kopp | G02B 6/02085 385/37 |
| 2003/0179999 A1* | 9/2003 | Kopp | G02B 6/02085 385/37 |
| 2003/0209655 A1* | 11/2003 | Wang | G01L 1/246 250/227.14 |
| 2004/0036955 A1* | 2/2004 | Digonnet | G02B 6/03638 359/341.1 |
| 2004/0145704 A1 | 7/2004 | Kopp et al. | |
| 2005/0226560 A1* | 10/2005 | Kopp | G02B 6/02147 385/37 |
| 2006/0104582 A1* | 5/2006 | Frampton | B29C 47/0028 385/123 |
| 2006/0126679 A1 | 6/2006 | Brennan, III et al. | |
| 2006/0291768 A1* | 12/2006 | Wang | G01L 1/246 385/13 |
| 2008/0098772 A1 | 5/2008 | Kopp et al. | |
| 2009/0324159 A1 | 12/2009 | Kopp et al. | |
| 2010/0002983 A1 | 1/2010 | Kopp et al. | |
| 2010/0008627 A1* | 1/2010 | Kopp | G02B 6/02071 385/37 |
| 2010/0158438 A1 | 6/2010 | Churikov et al. | |
| 2011/0292676 A1 | 12/2011 | Weiner et al. | |
| 2011/0293219 A1 | 12/2011 | Weiner et al. | |
| 2012/0189241 A1 | 7/2012 | Kopp et al. | |
| 2012/0257857 A1 | 10/2012 | Kopp et al. | |
| 2013/0121641 A1 | 5/2013 | Singer et al. | |
| 2013/0188174 A1 | 7/2013 | Kopp et al. | |
| 2013/0188175 A1 | 7/2013 | Kopp et al. | |
| 2013/0216184 A1 | 8/2013 | Kopp et al. | |
| 2015/0212274 A1 | 7/2015 | Kopp | |
| 2017/0219774 A1 | 8/2017 | Kopp | |
| 2017/0268937 A1 | 9/2017 | Kopp et al. | |
| 2017/0269277 A1 | 9/2017 | Weiner et al. | |
| 2017/0276867 A1 | 9/2017 | Kopp | |
| 2017/0299806 A1 | 10/2017 | Kopp | |
| 2017/0336570 A1 | 11/2017 | Kopp et al. | |
| 2017/0336659 A1 | 11/2017 | Kopp et al. | |
| 2019/0025501 A1 | 1/2019 | Kopp | |
| 2019/0049657 A1 | 2/2019 | Kopp et al. | |

FOREIGN PATENT DOCUMENTS

| | | |
|---|---|---|
| WO | WO 03/058309 A1 | 7/2003 |
| WO | WO 03/083540 A1 | 10/2003 |
| WO | WO 2004/027476 A1 | 4/2004 |
| WO | WO 2006/021609 A1 | 3/2006 |
| WO | WO 2006/046947 A2 | 5/2006 |
| WO | WO 2007/057024 A2 | 5/2007 |
| WO | WO 2008/080174 A1 | 7/2008 |
| WO | WO 2009/158661 A2 | 12/2009 |
| WO | WO 2010/009101 A2 | 1/2010 |
| WO | WO 2010/071861 A2 | 6/2010 |
| WO | WO 2017/053479 A1 | 3/2017 |
| WO | WO 2017/100667 A1 | 6/2017 |
| WO | WO 2018/085435 A1 | 5/2018 |
| WO | WO 2018/227008 A1 | 12/2018 |

OTHER PUBLICATIONS

Kopp et al., Single- and double-helix chiral fiber sensors, J. Opt. Soc. Am. B 24, A48-A52 (2007).*
Tuz et al., Defect modes in a periodic structure with chiral layers, J. Opt. Soc. Am. A 26, 815-819 (2009).*
Chiral-Photonics-Publications, available at http://www.chiralphotonics.com/Web/publications.html?pubsel=A.*
Chiral-Photonics-Technical-Background, available at http://www.chiralphotonics.com/Web/management.html.*
Academic-Website, available at http://physics.qc.cuny.edu/people/faculty/agenack.*
Chen et al., Polarization-dependent filters based on chiral photonic structures with defects, J. Opt. A: Pure Appl. Opt. 7 (2005) 558-566.*

(56) References Cited

OTHER PUBLICATIONS

Fan et al., Guided and defect modes in periodic dielectric waveguides, J. Opt. Soc. Am. B 12, 1267-1272 (1995).*
Kopp et al., Lasing in chiral photonic structures, Progress in Quantum Electronics, 2003, available at http://physics.qc.cuny.edu/uploads/5/articles/Prog_Quant_Elect_proof0.pdf.*
Eggleton et al., Microstructured optical fiber devices, Dec. 17, 2001 / vol. 9, No. 13 / Optics Express (Year: 2001).*
T. J. Seok, V. Kopp, D. Neugroschl, J. Henriksson, J. Luo, and M. C. Wu, "High density optical packaging of high radix silicon photonic switches," 2017 Optical Fiber Communications Conference and Exhibition (OFC), Los Angeles, CA, Optical Society of America, pp. 1-3 (2017).
P. De Heyn, V.I. Kopp, S. A. Srinivasan, P. Verheyen, J. Park, M.S. Wlodawski, J. Singer, D. Neugroschl, B. Snyder, S. Balakrishnan, G. Lepage, M. Pantouvaki, P. Absil, and J. Van Campenhout, "Ultra-dense 16×56Gb/s NRZ GeSi EAM-PD arrays coupled to multicore fiber for short-reach 896Gb/s optical links," 2017 Optical Fiber Communications Conference and Exhibition (OFC), Los Angeles, CA, Optical Society of America, pp. 1-3 (2017).
V.I. Kopp, J. Park, M.S. Wlodawski, J. Singer, D. Neugroschl, P. de Heyn, B. Snyder, J. Van Campenhout, and P. Absil, "Flexible, Multi-channel, Ultra-dense Optical Interface for Silicon Photonics," ECOC 2016; 42nd European Conference on Optical Communications, Dusseldorf, Germany, 755-757 (2016).
P. Liao, M. Sakib, F. Lou, J. Park, M. Wlodawski, V.I. Kopp, D. Neugroschl, and O. Liboiron-Ladouceur, "Ultradense Silicon Photonic Interface for Optical Interconnection," in IEEE Photonics Technology Letters, vol. 27, No. 7, pp. 725-728 (2015).
V.I. Kopp, J. Park, M. Wlodawski, E. Hubner, J. Singer, D. Neugroschl, A. Z. Genack, P. Dumon, J. Van Campenhout, and P. Absil, "Two-Dimensional, 37-Channel, High-Bandwidth, Ultra-Dense Silicon Photonics Optical Interface," Journal of Lightwave Technology, vol. 33, No. 3, pp. 653-656 (2015).
V. I. Kopp, J. Park, M. S. Wlodawski, E. Hubner, J. Singer, D. Neugroschl, and A. Z. Genack, "Vanishing Core Optical Waveguides for Coupling, Amplification, Sensing, and Polarization Control," in Advanced Photonics, OSA Technical Digest (online), paper SoW1 B.3, Optical Society of America, pp. 1-3 (2014).
M. Wlodawski, V.I. Kopp, J. Park, J. Singer, E. Hubner, D. Neugroschl, N. Chao, and A.Z. Genack, "A new generation of ultra-dense optical I/O for silicon photonics," Proceedings of SPIE—The International Society for Optical Engineering. vol. 8990, 899006, pp. 1-12 (2014).
V.I. Kopp, J. Park, M. Wlodawski, J. Singer, and D. Neugroschl, "Polarization maintaining, high-power and high-efficiency (6+1)×1 pump/signal combiner", Proc. SPIE 8961, Fiber Lasers XI: Technology, Systems, and Applications, 89612N, pp. 1-6 (2014).
V. I. Kopp, J. Park, M. Wlodawski, J. Singer, D. Neugroschl and A. Z. Genack, "Chiral Fibers: Microformed Optical Waveguides for Polarization Control, Sensing, Coupling, Amplification, and Switching," in Journal of Lightwave Technology, vol. 32, No. 4, pp. 605-613 (2014).
D. Neugroschl, J. Park, M. Wlodawski, J. Singer, and V.I. Kopp, "High-efficiency (6+1)×1 combiner for high power fiber lasers and amplifiers", Proc. SPIE 8601, Fiber Lasers X: Technology, Systems, and Applications, 860139, pp. 1-6 (2013).
V. I. Kopp, J. Park, M. Wlodawski, J. Singer, D. Neugroschl and A. Z. Genack, "Pitch Reducing Optical Fiber Array and multicore fiber for space-division multiplexing," 2013 IEEE Photonics Society Summer Topical Meeting Series, Waikoloa, HI, pp. 99-100 (2013).
V. I. Kopp, J. Park, M. Wlodawski, J. Singer, D. Neugroschl and A. Z. Genack, "Pitch Reducing Optical Fiber Array for dense optical interconnect," IEEE Avionics, Fiber-Optics and Photonics Digest CD, Cocoa Beach, FL, 2012, pp. 48-49.
J. Park, M.S. Wlodawski, J. Singer, D. Neugroschl, A.Z. Genack, V.I. Kopp, "Temperature and Pressure Sensors Based on Chiral Fibers", Proc. of SPIE 8370, 837008, pp. 1-8 (2012).
F.E. Doany, B.G. Lee, S.Assefa, W.M.J. Green, M. Yang, C.L. Schow, C.V. Jahnes, S. Zhang, J. Singer, V.I. Kopp, J.A. Kash, and Y.A. Vlasov, "Multichannel High-Bandwidth Coupling of Ultra-Dense Silicon Photonic Waveguide Array to Standard-Pitch Fiber Array", IEEE J. of Lightwave Technology, 29, 4, 475-482 (2011).
V.I. Kopp, J. Singer, D. Neugroschl, and A.Z. Genack, "Chiral fiber sensors for harsh environments", Proc. SPIE 8028, Fiber Optic Sensors and Applications VIII, 802803, pp. 1-8 (2011).
V.I. Kopp and A.Z. Genack, "Chiral Fibres: Adding Twist", Nature Photonics 5, 470-472 (2011).
V.I. Kopp, V.M. Churikov, J. Singer, D. Neugroschl, and A.Z. Genack, "Chiral fiber sensors," Proc. SPIE 7677, Fiber Optic Sensors and Applications VII, 76770U, pp. 1-6 (2010).
V.M. Churikov, V.I. Kopp, and A.Z. Genack, "Chiral diffraction gratings in twisted microstructured fibers", Opt. Lett. 35(3), 342-344 (2010).
S. Guillemet, D. Kinet, A. Bertrand, Y. Hernandez, and D. Giannone, "High Power All-In-Fibre Linearly Polarized Laser Using Chiral Grating-Based Polarizer", 4th EPS-QEOD Europhoton Conference, 1 page (2010).
C. R. Doerr, L. Zhang, P. J. Winzer, "Monolithic InP Multi-Wavelength Coherent Receiver", Proc. OFC, paper PDPB1, Optical Society of America, pp. 1-3, (2010).
S. Guillemet, D. Kinet, A. Bertrand, Y. Hernandez, and D. Giannone, "Experimental study and comparison of three innovative high power CW polarised all-in-fibre laser designs", IEEE Photonics Benelux Chapter, 141-144 (2010).
H. Henschel, S.K. Hoeffgen, J. Kuhnhenn and U. Weinand, "High Radiation Sensitivity of Chiral Long Period Gratings", IEEE Transaction on Nuclear Science, 57, 5, 2915-2922 (2010).
V.M. Churikov, V.I. Kopp, A.Z. Genack, "Dual-twist fiber long period gratings", Proceedings of SPIE 7212, 72120H, pp. 1-9 (2009).
V.I. Kopp, G. Zhang, S. Zhang, A.Z. Genack, and D. Neugroschl, "Chiral fiber optical isolator", Proceedings of SPIE 7195, 71950B, pp. 1-8 (2009).
S. Zhang, V.I. Kopp, V. Churikov, and G. Zhang, "Panda-based chiral in-fiber polarizer", Proceedings of SPIE 7212, 72120D, pp. 1-8 (2009).
G. Shvets, S. Trendafilov, V.I. Kopp, D. Neugroschl, and A.Z. Genack, "Polarization properties of chiral fiber gratings", J. Opt. A: Pure Appl. Opt. 11, 074007, pp. 1-10 (2009).
C.R. Doerr, L. Zhang, L. Buhl, V.I. Kopp, D. Neugroschl, and G. Weiner, "Tapered Dual-Core Fiber for Efficient and Robust Coupling to InP Photonic Integrated Circuits", Proc. OFC, Optical Society of America, pp. 1-3 (2009).
D. Neugroschl, V.I. Kopp, J. Singer, and G. Zhang, "Vanishing-core tapered coupler for interconnect applications", Proceedings of SPIE 7221, 72210G, pp. 1-8 (2009).
V. I. Kopp, V. M. Churikov, and A. Z. Genack, "Chiral Fiber Gratings Sense the Environment", Laser Focus World, 76-79 (2008).
V. I. Kopp and A. Z. Genack, "Chiral fibers", Chapter 12 in Specialty Optical Fibers Handbook edited by Alexis Mendez and T. F. Morse. Academic Press, 401-427 (2007).
V. I. Kopp, V. M. Churikov, G. Zhang, J. Singer, C. W. Draper, N. Chao, D. Neugroschl, and A.Z. Genack, "Single- and double-helix chiral fiber sensors", J. Opt. Soc. Am. B 24(10), A48-A52 (2007).
V. I. Kopp, V. M. Churikov, G. Zhang, J. Singer, C. W. Draper, N. Chao, D. Neugroschl, and A.Z. Genack, "Chiral fiber gratings: perspectives and challenges for sensing applications", (Invited Paper), Proceedings of SPIE 6619, 66190B, pp. 1-8 (2007).
V. I. Kopp, V. M. Churikov, and A. Z. Genack, "Synchronization of optical polarization conversion and scattering in chiral fibers", Optics Letters 31(5), 571-573 (2006).
A. Z. Genack, V. I. Kopp, V. M. Churikov, J. Singer, N. Chao, and D. Neugroschl, "From planar to fiber chiral gratings", (Invited Paper), Proceedings of SPIE 5741, 90-97 (2005).
A. Z. Genack, V. I. Kopp, V. M. Churikov, J. Singer, N. Chao, and D. Neugroschl, "Chiral fiber Bragg gratings", Proceedings of SPIE 5508, 57, pp. 1-8 (2004).
V.I. Kopp, V.M. Churikov, J. Singer, N. Chao, D. Neugroschl, and A. Z. Genack, "Chiral fiber gratings", Science 305, 74-75 (2004).
V. I. Kopp, A. Z. Genack, V. M. Churikov, Jonathan Singer and Norman Chao, "Chiral Fiber Gratings Polarize Light", Photonics Spectra 38, 78-79 (2004).

(56) References Cited

OTHER PUBLICATIONS

P.V. Shibaev, V.I. Kopp, and A.Z. Genack, "Photonic materials based on mixtures of cholesteric liquid crystals with polymers", J. Phys. Chem. B.107, 6961-6964 (2003).

V.I. Kopp and A.Z. Genack, "Double-helix chiral fibers", Optics Letters 28(20), 1876-1878 (2003).

P.V. Shibaev, K. Tang, A.Z. Genack, V. Kopp, and M. M. Green, "Lasing from a stiff chain polymeric lyotropic cholesteric liquid crystal", Macromolecules 35(8), 3022-3025 (2002).

V.I. Kopp and A.Z. Genack, "Twist defect in chiral photonic structures", Physical Review Letters 89(3), 033901, pp. 1-4 (2002).

V. I. Kopp, P. V. Shibaev, R. Bose, and A. Z. Genack, "Anisotropic photonic-bandgap structures", Proceedings of SPIE 4655, 141-149 (2002).

V.I. Kopp, Z.-Q. Zhang and A.Z. Genack, "Large coherence area thin-film photonic stop-band lasers", Physical Review Letters 86(9), 1753-1756 (2001).

V. I. Kopp and A. Z. Genack, "Density of states and lasing at the edge of a photonic stop band in dye-doped cholesteric liquid crystals", Proceedings of SPIE 3623, 71-79 (1999).

V.I. Kopp and A.Z. Genack, "Lasing at the edge of a photonic stop band in cholesteric liquid crystals", IEEE LEOS 13, No. 2, 8-10 (1999).

V.I. Kopp, B.Fan, H.K.M. Vithana, and A.Z. Genack, "Low-threshold lasing at the edge of a photonic stop band in cholesteric liquid crystals", Optics Letters 23(21), 1707-1709 (1998).

B.G. Lee, F.E.Doany, S. Assefa, W.M.J. Green, M. Yang, C.L. Schow, C.V. Jahnes, S. Zhang, J. Singer, V.I. Kopp, J.A. Kash, and Y.A. Vlasov, "20-um-Pitch Eight-Channel Monolithic Fiber Array Coupling 160 Gb/s/Channel to Silicon Nanophotonic Chip", Proc. OFC, PDPA4, Optical Society of America, pp. 1-3, (2010).

International Search Report and Written Opinion of PCT/US2009/068877 dated Jul. 1, 2010 in 7 pages.

Extended European Search Report of EP Appl. No. 09833867.6 dated Jun. 5, 2012 in 8 pages.

\* cited by examiner

FIBER OPTIC DIFFRACTION GRATING

CROSS REFERENCE TO RELATED APPLICATIONS

The present patent application is a continuation of U.S. application Ser. No. 12/642,498 entitled "Fiber Optic Diffraction Grating", filed Dec. 18, 2009, which claims priority benefit from the commonly assigned co-pending U.S. provisional patent application 61/138,907 entitled "Fiber Optic Diffraction Grating", filed Dec. 18, 2008.

FIELD OF THE INVENTION

The present invention relates generally to fiber grating type structures, and more particularly to an optical fiber grating capable of diffracting a portion of a light signal transmission therethrough at at least one predefined wavelength thereof.

BACKGROUND OF THE INVENTION

Fiber gratings are incorporated into components that form the backbone of modern information and communications technologies, and are suitable for a wide range of applications, such as information processing and optical fiber communication systems utilizing wavelength division multiplexing (WDM). There are many different fiber grating types and configurations, with a wide variety of capabilities. For example, fiber Bragg gratings are useful in lasing, filtering and sensing applications. Various Bragg grating configurations also include chirped fiber gratings useful in chromatic dispersion compensators and apodized fiber gratings that are used to eliminate sidelobes in signal transmission spectra. Another type of fiber grating—a long period grating—is of particular interest in sensing and filtering applications. Light passing through a long period grating is modified rather than reflected, as occurs in fiber Bragg gratings. Also, unlike a fiber Bragg grating, a long period grating is typically used for coupling the mode of the fiber core into the fiber cladding. A long period grating has a spectral characteristic with multiple transmission gaps. The positions of these gaps along the spectral range depend on the refractive index of a medium outside the cladding of the fiber. Thus, changing the outside refractive index produces a shift in the transmission gaps. Typically, the period of a long period grating is significantly longer than the wavelength of light passing through the grating.

However, there are also a number of important applications for which an optical fiber grating constructed and configured to produce at least one spectral dip (corresponding to at least one predefined wavelength) in the transmission spectrum of a light signal being transmitted therethrough, for which such a grating would be the only practical solution, or for which it would be the best solution (or at least a more optimal solution than a long period grating). This is especially the case in applications where fiber gratings of very small lengths are desirable or necessary.

There are also useful applications for which it would be advantageous to provide the above-described diffraction grating that is substantially produced from a single material (as opposed to conventional gratings which typically have cores and claddings of different materials (or which may use the same material for the core and cladding with one of the materials being doped by another material), to ensure a predetermined minimum index contrast value therebetween. Additionally, there are applications for which it would be useful to have a grating capable of producing at least one spectral peak in its core light transmission spectrum, corresponding to at least one predetermined wavelength.

It would thus be desirable to provide an optical fiber grating for controlling the light signal transmission therethrough by diffracting a portion of the transmitted light signal at at least one predefined wavelength thereof, causing at least one of: at least one predetermined spectral dip, and/or at least one predetermined peak, in the resulting light transmission spectrum, each corresponding to the at least one wavelength of the diffracted portions(s) of the transmitted light signal. It would also be desirable to provide the above-described fiber optic diffraction grating that may be readily fabricated in its entirety from a single material.

BRIEF DESCRIPTION OF THE DRAWINGS

In the drawings, wherein like reference characters denote corresponding or similar elements throughout the various figures.

SUMMARY OF THE INVENTION

Figure 1A:
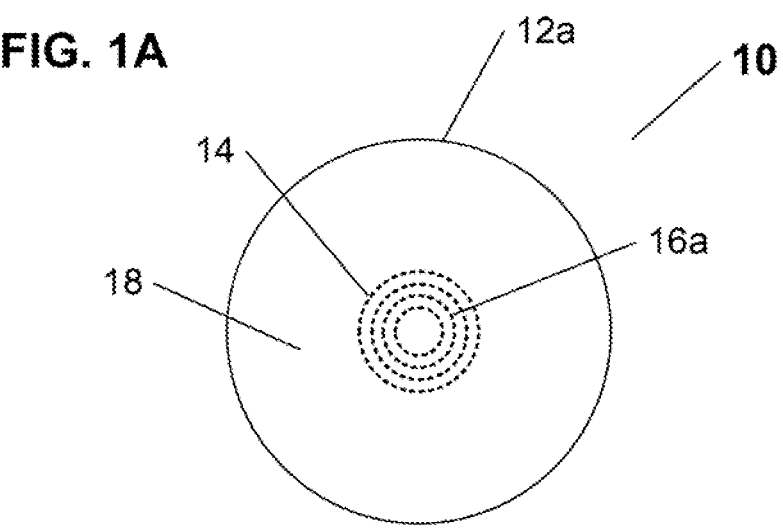
FIG. 1A shows a schematic diagram of a cross-sectional view of a first exemplary embodiment of the fiber optic diffraction grating of the present invention.

The present invention is directed to an optical fiber grating having a core, that is capable of controlling the light signal transmission therethrough by causing at least one of: at least one spectral peak, and/or at least one spectral dip in its core light transmission spectrum, corresponding to at least one predetermined wavelength.

The inventive optical fiber diffraction grating comprises at least one longitudinally positioned structural element of a predetermined geometric profile and that is configured for diffracting a portion of the transmitted light signal at at least one predefined wavelength thereof, from at least one core mode into at least one of: at least one cladding mode and/or at least one radiating mode. Various embodiments of a number of novel techniques for fabrication of the inventive optical fiber diffraction grating are provided, inclusive of a novel technique for fabricating the inventive grating from a single material.

Advantageously, such novel fabrication techniques rely on configuration of a desired geometric profile for the at least one structural element portion of the novel grating, each profile comprising a number of readily configurable parameters that can be selected and/or adjusted during fabrication, to produce a variety of novel fiber diffraction gratings, each having a corresponding specific desirable core transmission spectrum having at least one of: least one spectral peak, and/or at least one spectral dip therein, corresponding to at least one specific desired wavelength, dependent on the configuration of the applicable geometric profile.

Other objects and features of the present invention will become apparent from the following detailed description considered in conjunction with the accompanying drawings.

It is to be understood, however, that the drawings are designed solely for purposes of illustration and not as a definition of the limits of the invention, for which reference should be made to the appended claims.

DETAILED DESCRIPTION OF THE PREFERRED EMBODIMENTS

The present invention is directed to an optical fiber grating having a core, that is capable of controlling the light signal transmission therethrough by causing at least one of: at least one spectral peak, and/or at least one spectral dip in its core light transmission spectrum, corresponding to at least one predetermined wavelength. The inventive optical fiber diffraction grating accomplishes the above, by providing at least one longitudinal structural element therein of a predetermined geometric profile and that is configured for diffracting a portion of the transmitted light signal at at least one predefined wavelength thereof, from at least one core mode into at least one of: at least one cladding mode and/or at least one radiating mode.

In various embodiments of the inventive optical fiber diffraction grating, an number of novel techniques for fabrication thereof are provided, inclusive of a novel technique for fabricating the inventive grating from a single material. Advantageously, the various novel fabrication techniques provided for the novel fiber diffraction grating in accordance with the present invention rely on configuration of a desired geometric profile for the at least one structural element portion of the novel grating, each profile comprising a number of readily configurable parameters that can be selected and/or adjusted during fabrication, to produce a variety of novel fiber diffraction gratings, each having a corresponding specific desirable core transmission spectrum having at least one of: least one spectral peak, and/or at least one spectral dip therein, corresponding to at least one specific desired wavelength, dependent on the configuration of the applicable geometric profile.

It is well known that in conventional optical fibers the necessary index contrast between the fiber core and cladding, to ensure that a light signal being transmitted therethrough would substantially travel in a core mode, can be achieved in a number of different ways, for example by using materials with sufficiently different refractive index for each of the core and the cladding, through doping of the core with an appropriate material, and in other well-known ways.

In recent years, a different solution, for producing an optical fiber capable of guiding light through its core, has been successfully developed—microstructured ("MS") optical fibers are fibers that enable a different way of guiding light through their cores, and that can be fabricated from a single material (without necessity for doping the core). Instead of a conventional core, the MS fibers in essence provide a "virtual" core, that is defined by a set of specially configured and positioned predetermined longitudinal elements disposed around the fiber's central longitudinal axis. For example, these longitudinal elements may be a periodic array of longitudinal channels (i.e., "holes") in the cladding positioned around the fiber's central axis to define a "core", with light transmitted therethrough now being guided in such a core. This advantageous light confinement to/within the MS fiber core takes effect, and is determined by, at least one of the following two main reasons:

(1) effective refractive index of the cladding is lower that the region of the MS "core", and/or (2) the structure of periodic array of channels results in Bragg reflections in the MS fiber structure that cause the MS "core" to guide light, for example through a centermost channel.

In accordance with various embodiments of the present invention, the novel optical fiber diffraction grating may be readily produced and configured, either by processing a conventional MS fiber structure in a novel manner (as described below in connection with FIGS. 1A and 1B), and/or by preparing a specially configured novel structure based on, but departing, at least in part, from MS fiber principles.

Figure 1B:
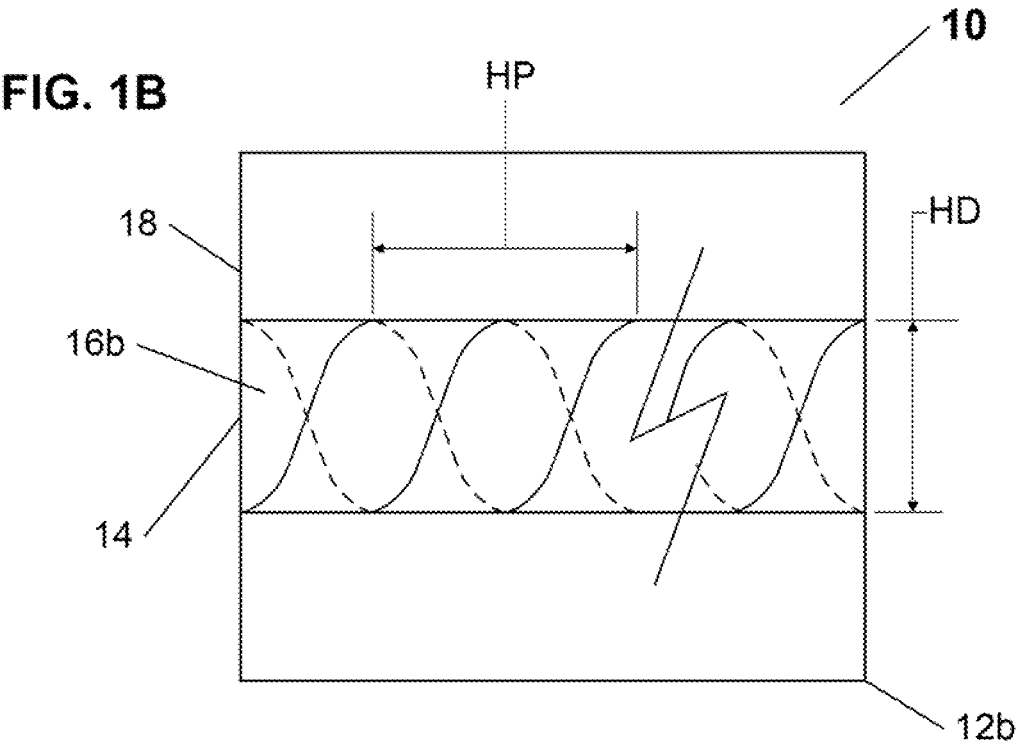
FIG. 1B shows a schematic diagram of a side view of the first exemplary embodiment of the fiber optic diffraction grating of FIG. 1A.

Referring now to FIGS. 1A and 1B, a first embodiment of the inventive optical fiber diffraction grating is shown as diffraction grating 10, based on a MS fiber structure perform 12a having a virtual core 14, and having at least one MS element 16a positioned and configured to produce a sufficient degree of light confinement to define the core 14 (for example, as shown in FIG. 1A, at least one MS element 16a may comprise a plurality of concentrically positioned sets of longitudinal channels in the fiber structure. This MS fiber 12a configuration produces a core mode in the core 14, however at least some portion of the energy of a light signal transmitted through the core 14 in fact propagates into the cladding 18, essentially forming light transmission spectrum "tails" (in the direction of the channels)

In accordance with the present invention, the diffraction grating 10 is produced by twisting the MS structure preform 12a, to produce a modified structure 12 having at least one structural element 16b therein, of a predefined geometric profile, comprising specifically selected values for at least a twist helical pitch HP (e.g., at a certain pitch angle), and a twist helical diameter HD (and in connection with this inventive embodiment also comprising a "twist profile").

As the MS structure preform 12a is twisted, the above-mentioned "tails" begin to cross the forming at least one structural element 16b, and with a properly selected geometric profile (i.e., for predetermined values of HP and HD), Bragg reflections, configured to diffract the light signal from a core mode of at least one predetermined wavelength traveling through the core 14, for at least one particular desired wavelength, away from the core 14 (thus essentially extracting at least a portion of the light signal from the core 14, and causing a corresponding dip in the core transmission spectrum). In one embodiment of the present invention, at certain wavelengths the resulting core transmission may appear similar to that of a long period grating (although in the case of the inventive grating 10, the spectral dips in the transmission spectrum would not me sensitive to any outside medium).

Advantageously, the various parameters (HP, HD, etc.) of the geometric profile of the at least one structural element 16b, may be selected and/or configured to produce at least one spectral dip, and/or at least one spectral peak in the core transmission spectrum for one or more predefined desired wavelengths. The geometric profile of the at least one structural element 16b, may be also selected and/or configured to produce at least one radiating mode (i.e., in which Bragg reflections cause the diffracted portion of the light signal to leave the fiber completely). Therefore, advantageously, the novel diffraction grating 10, may achieve the desired diffraction in at least one of: at least one cladding mode, and/or at least one radiating mode.

While the use of a single material, with plural channels as MS elements, for the perform 12a is advantageous for certain applications (such as for sensor elements that may be heated in a manner sufficient to cause the resulting grating 10 to expand and then contract, in other embodiments of the invention, the at least one MS element 16a (e.g., channels) can be filled with different materials (e.g., vacuum, air, a predetermined gaseous substance, or a predetermined dielectric material, etc.) or may otherwise comprise regions of a different refractive index from the cladding 18. The advantage of this approach, is that it allows a greater level of control of the index contrast between the core 14 and the cladding 18. If this embodiment is utilized then both of the light confinement principles (1) and (2) described above are jointly applicable, with the impact of each principle being dependent on the positioning of the MS elements 16a within the perform 12a. In another embodiment of the invention, the MS elements 16a may comprise a plurality of groves (not shown).

Figure 2A:
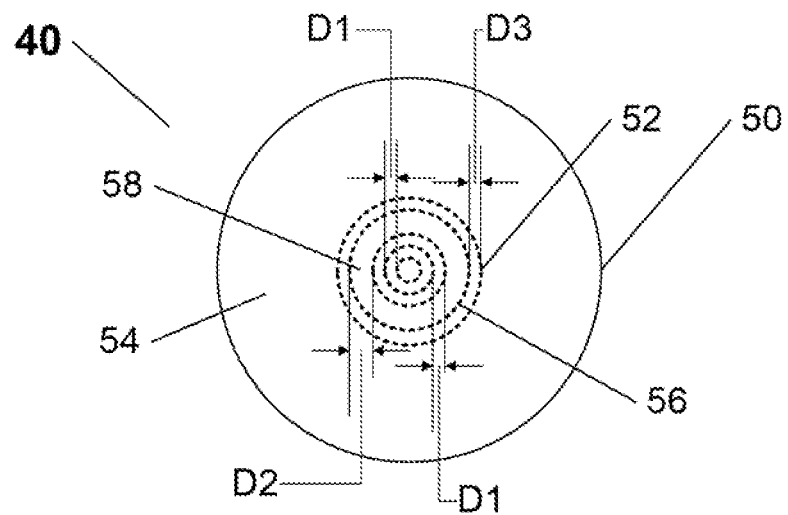
FIG. 2A shows a schematic diagram of a cross-sectional view of a second exemplary embodiment of the fiber optic diffraction grating of the present invention.
Figure 2B:
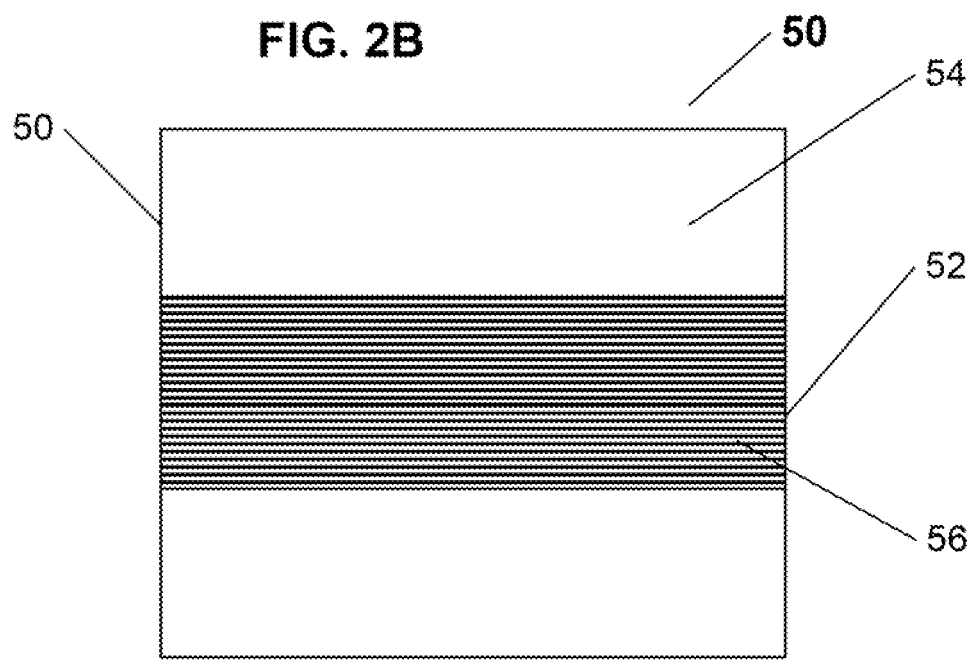
FIG. 2B shows a schematic diagram of a side view of the second exemplary embodiment of the fiber optic diffraction grating of FIG. 2A.

Referring now to FIGS. 2A and 2B, a second embodiment of the inventive optical fiber diffraction grating is shown as diffraction grating 40, based on a specially configured MS fiber structure 50, having a virtual core 52, and having a plurality of structural elements 56 positioned and configured to produce a sufficient degree of light confinement to define the core 52, and to also produce at least one predefined distortion in lateral periodicity 58, between the plural structural elements thereof, that advantageously results in at least one predefined narrow defect state in the light transmission spectrum in a transverse direction, which causes a corresponding at least one spectral dip in the core transmission spectrum for at least one wavelength that corresponds to the at least one defect state.

Distortion 58 can be achieved in a number of different ways. For example, if distances between each concentric set of different plural structural elements 56 are substantially the same (e.g., D1), then the least one predefined distortion in lateral periodicity 58 may be readily produced by configuring the distance between two predetermined plural element 56 sets (selected based on the needed spectral position corresponding to the desired defect state), can be configured as D2, different from other uniform D1s. Other inventive ways of achieving at least one distortion 58, for example by altering the size of one or more particular concentric sets of plural elements 56, or by using one or more particular concentric sets of plural elements 56 composed of a different material than core 54 (i.e., having different refractive indices therefrom). The diffracting grating 40 is advantageous in that it does not require the structure 50 to be twisted or to otherwise be physically manipulated (other than the pre-configuration necessary to produce the at least one distortion 58).

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A fiber diffraction grating having at least one diffracted wavelength for controlling a light signal transmission of at least one wavelength therethrough, comprising:

a modified optical fiber comprising a fiber core and a fiber cladding, said modified optical fiber having at least one core mode, and at least one of: at least one cladding mode and at least one radiating mode, said modified optical fiber further comprising:

at least one structural element having a geometrical profile, wherein said geometrical profile is configured to diffract a light signal of said at least one core mode away from the fiber core at said at least one diffracted wavelength, selected from the at least one transmission signal wavelength, wherein said at least one diffracted wavelength is not sensitive to the refractive index of a medium outside the fiber cladding.

2. The fiber diffraction grating of claim 1, wherein said geometrical profile comprises a helical pitch, a helical diameter, and a single handedness.

3. The fiber diffraction grating of claim 2, wherein said helical pitch and said helical diameter are further configured to couple light into at least one of said at least one radiating mode.

4. The fiber diffraction grating of claim 2, wherein said helical pitch and said helical diameter are further configured to couple light into at least one of said at least one cladding mode.

5. The fiber diffraction grating of claim 2, wherein the light signal transmission comprises a core transmission spectrum, representative of the light signal transmitted in said at least one core mode, and wherein said helical pitch and said helical diameter are further configured to produce at least one of: a spectral dip or a spectral peak in said core transmission spectrum.

6. The fiber diffraction grating of claim 2, wherein said modified optical fiber comprises a microstructured optical fiber that has been twisted, in accordance with a twist profile, to produce therein said at least one structural element of said helical pitch and said helical diameter.

7. The fiber diffraction grating of claim 1, wherein the light signal transmission comprises a core transmission spectrum, representative of the light signal transmitted in said at least one core mode, and wherein said modified optical fiber comprises a microstructured optical fiber having at least one distortion in lateral periodicity therein that is configured to produce at least one defect state, each at least one defect state causing a corresponding at least one spectral dip in said core transmission spectrum.

8. The fiber diffraction grating of claim 1, wherein said at least one structural element comprises a plurality of longitudinal channels defined within said modified optical fiber, and sized and positioned in accordance with a first pattern.

9. The fiber diffraction grating of claim 8, wherein at least a portion of said plurality of longitudinal channels is filled with vacuum, air, a gaseous substance, or a dielectric material.

10. The fiber diffraction grating of claim 1, wherein said at least one structural element comprises a plurality of longitudinal grooves defined in said modified optical fiber, and sized and positioned in accordance with a first pattern.

11. The fiber diffraction grating of claim 10, wherein at least a portion of said plurality of longitudinal grooves is filled with air or a dielectric material.

* * * * *